United States Patent Office — 3,423,172, Patented Jan. 21, 1969

3,423,172
PRODUCTION OF PLASTER OF PARIS
Gerald Waterworth Cafferata, Epperstone, Nottinghamshire, England, assignor to BPB Industries Limited
No Drawing. Filed May 25, 1964, Ser. No. 370,023
Claims priority, application Great Britain, May 28, 1963, 21,304/63
U.S. Cl. 23—122        3 Claims
Int. Cl. C01f 1/00; C04b 11/00

ABSTRACT OF THE DISCLOSURE

A process for preparation of calcined gypsum whose crystal size is larger than that of the starting gypsum wherein the ground gypsum is suspended in from 25% to 67% of its weight of water which contains a crystal habit modifier and is calcined under pressure in an essentially quiescent condition.

---

The present invention relates to improvements in the production of plaster of Paris.

It has long been known to produce plaster of Paris by heating powdered gypsum alone, in water or in steam in an autoclave at temperatures between 120° C. and 170° C. and thereafter drying. The proportion of water required to gauge plaster of Paris so produced is, however, relatively high so that the mechanical strength of set products is not good.

Proposals have been made for obtaining, by autoclaving, an improved product requiring less water for gauging with consequent higher set strength, the starting material being lumps of gypsum, but lump starting material is less convenient to use than powdered material and furthermore the method does not result in a product requiring a minimum amount of water for gauging.

With a view to obtaining a plaster of Paris requiring less water for gauging, and consequently higher mechanical strength, it has been proposed to autoclave, with vigorous agitation, a mix of powdered gypsum and water with additions of succinic acid, maleic acid, citric acid, phthalic acid or malic acid or soluble salts thereof. Due to the necessity of agitating the mix, however, these autoclaving methods have required the use of a high proportion of water to gypsum in the autoclave, all of which it is necessary to remove by final filtering, centrifuging or other drying steps.

It has now been found that plaster of Paris possessing high set strength can be produced by heating under pressure a mixture of powdered gypsum with considerably lower proportions of water than those previously proposed.

According to the present invention, plaster of Paris is produced by heating under pressure a mix of powdered gypsum and one or more of succinic acid, citric acid, phthalic acid, maleic acid and malic acid and/or water soluble salts thereof with from 25% to 67% of water, based on the weight of dry gypsum, to convert the gypsum to plaster of Paris of the "alpha" type. On account of the relatively low proportion of water required in this process reduced amounts of the organic acids or their salts may be used as crystal modifiers, suitable proportions ranging between 0.025% and 0.067% in total based on the dry weight of the gypsum; the optimum quantity of acid or salt or both varies with the type of gypsum used as starting material. Furthermore, by employing such a relatively low proportion of water in the initial gypsum mix, the tendency of the solid components to settle out is considerably reduced, thus making it easier to maintain the mix in a substantially homogeneous condition during the calcination process.

It has further been found that the avoidance of turbulence in the mix during calcination encourages the formation of much larger crystals of plaster of Paris. This is of considerable importance, as larger crystals allow easier filtration of the mass, and are more readily ground to a controlled grain size, giving maximum compaction and yielding a stronger set product as a result.

Accordingly, in a preferred method of performing the invention the mix is heated under substantially quiescent conditions. The mix may however be subjected to a gentle slow-speed and/or intermittent mixing action at this stage without inhibiting the formation of large crystals, and when the calcination is carried out in a steam-jacketed autoclave such mixing ensures good heat transfer from the jacket to the mix.

When calcination is completed the mix may with benefit be agitated, with or without the introduction of additional water, to facilitate its removal from the autoclave.

The named acids or their salts may be used singly or in combination and their use in the quantities indicated in conjunction with proportions of water to gypsum near the lower end of the range indicated produced a mix of paste-like consistency; with proportions of water to gypsum near the middle of the range indicated, a mix of slurry of flowable consistency is obtained; with proportions of water to gypsum near the higher end of the range indicated, a mix of pourable consistency is obtained.

The method according to the present invention may be carried out in autoclaves, or other pressure calciners, and the reduced quantity of water which it is necessary to heat up and ultimately remove from the plaster of Paris (when it is required in dry powder form), as compared with that required in known autoclaving methods in which powdered gypsum is used, represents an important economic advantage. In addition economy is achieved by the reduction in the amount used of the relatively expensive acid crystal modifiers, or the salts thereof. A further economy arises from the possibility of using autoclaves of reduced dimensions for a given charge of powdered gypsum.

Succinic acid and its water soluble salts appear to give the most consistently good results in the method of the invention. Citric, maleic and malic acids and their soluble salts have been found suitable particularly for use with a starting material comprising by-product gypsum.

In processes involving the use of large amounts of wet mixes of plaster of Paris, such as the manufacture of plasterboard, it is not necessary to dry the plaster of Paris so produced before use. It may instead be pasted into a suitable wet-grinding mill, such as a ball mill, and maintained therein at such a temperature that setting of the plaster of Paris does not take place during grinding. Where the plaster of Paris is to be employed in a process which requires rapid setting of the plaster, the temperature of the grinding mill can be so regulated that the plaster of Paris sets rapidly on issuing from the mill. If the amount of water present in the plaster of Paris mixture issuing from the autoclave after processing is insufficient to enable the mixture to be ground effectively in the wet-grinding mill or to enable it to be used effectively in the process for which it is required, additional water, at the desired temperature, can be introduced into the wet-grinding mill to facilitate the grinding or the subsequent employment of the wet-plaster of Paris mix.

It is preferred to use a neutral mix in the autoclave and most gypsums contain sufficient carbonate to neutralise the acidity of the small amount of succinic acid present in the mix where the acid is used in place of one of its salts.

Generally, the coarser the gypsum pregrind the larger are the crystals of hemi-hydrate produced and the longer is the necessary calcination time at any particular pressure and temperature.

The table below gives examples of temperature, time and pressure conditions under which the calcination process of the present invention may be performed:

| Temperature (° C.) | Steam pressure (p.s.i.) | Duration at stated temps. and pressures |
| --- | --- | --- |
| 126 | 20 | 60–200 mins. according to type of gypsum and grind. |
| 141.5 | 40 | 15–60 mins. according to type of gypsum and grind. |
| 153.0 | 60 | 10–30 mins. according to type of gypsum and grind. |
| 160.0 | 75 | 10–20 mins. according to type of gypsum and grind. |

The invention will now be further described in the following specific examples:

EXAMPLE 1

A mix consisting of:

|  | G. |
| --- | --- |
| Newark gypsum (—10 mesh) | 4,000 |
| Water (66.7% by weight) | 2,666 |
| Succinic acid (0.067% by weight) | 2.66 |
| Chalk (0.067% by weight) | 2.66 | was autoclaved for 30 minutes at a temperature of 141.6° C. and a pressure of 40 p.s.i., without stirring or mixing. Crystals of plaster of Paris were produced having an average breadth of 45 microns and lengths of up to 270 microns.

EXAMPLE 2

A mix consisting of:

|  | G. |
| --- | --- |
| Mountfield gypsum (80%—100 mesh) | 4,000 |
| Water (25% by weight) | 1,000 |
| Succinic acid (0.025% by weight) | 1 |
| Chalk (0.025% by weight) | 1 | was autoclaved for 30 minutes at a temperature of 141.6° C. and a pressure of 40 p.s.i., without stirring or mixing. Crystals of plaster of Paris were produced having an average breadth of 45 microns and lengths of up to 350 microns.

EXAMPLE 3

A mix consisting of:

| Southard gypsum (—⅜″) | 20 cwts. |
| --- | --- |
| Water (66.7% by weight) | 13⅓ cwts. |
| Succinic acid (0.067% by weight) | 1 lb., 8 ozs. | was autoclaved for 27 minutes at a temperature of 141.6° C. and a pressure of 40 p.s.i., without stirring or mixing. The size of the crystals of plaster of Paris produced ranged from 100 microns to 500 microns.

EXAMPLE 4

A mix consisting of:

| Southard gypsum (—⅜″) | 20 cwts. |
| --- | --- |
| Water (66.6% by weight) | 13⅓ cwts. |
| Succinic acid (0.067% by weight) | 1 lb., 8 ozs. | was calcined for 30 minutes at a temperature of 141.6° C. and a pressure of 40 p.s.i., the mix being stirred intermittently for 5 second periods every 2 minutes. The size of the crystals of plaster of Paris produced ranged from 100 microns to 500 microns.

EXAMPLE 5

A mix consisting of:

| Honiton gypsum (—10 mesh) | 25 cwts. |
| --- | --- |
| Water (66.6% by weight) | 16⅔ cwts. |
| Succinic acid (0.067% by weight) | 1 lb., 14 ozs. | was autoclaved for 30 minutes at a temperature of 141.6° C. and a pressure of 40 p.s.i., the mix being stirred intermittently for 5 second periods every 2 minutes. The size of the crystals of plaster of Paris produced ranged from 100 microns to 500 microns.

EXAMPLE 6

|  | Parts by wt. |
| --- | --- |
| Newark gypsum (—25 mesh) | 100.0 |
| Water | 50.0 |
| Citric acid | 0.05 |
| Calcium carbonate | 0.05 |

The above mixture was autoclaved, without stirring, for 1 hour at 40 p.s.i. steam pressure (141.6° C.). The crystalline hemi-hydrate plaster produced consisted of broad crystals of up to 500 microns in length with an average length of 135 microns.

EXAMPLE 7

|  | Parts by wt. |
| --- | --- |
| Newark gypsum (—25 mesh) | 100.0 |
| Water | 50.0 |
| Phthalic acid | 0.05 |
| Calcium carbonate | 0.05 |

This mixture was autoclaved, without stirring, under the same conditions of temperature, pressure and time as in Example 6. The broad crystals of hemi-hydrate plaster produced were of up to 500 microns in length with an average length of 135 microns.

EXAMPLE 8

|  | Parts by wt. |
| --- | --- |
| Precipitated gypsum | 100.0 |
| Water | 60.0 |
| Maleic acid | 0.06 |
| Calcium carbonate | 0.06 |

The above mixture was autoclaved without stirring for 1 hour at 40 p.s.i. steam pressure (141.6° C.). Broad crystals of hemi-hydrate plaster of up to 65 microns long and of average length 45 microns were produced.

EXAMPLE 9

|  | Parts by weight |
| --- | --- |
| Precipitated gypsum | 100.0 |
| Water | 60.0 |
| Malic acid | 0.06 |
| Calcium carbonate | 0.06 |

This mixture was autoclaved without stirring under the same conditions of temperature, pressure and time as in Example 8. Broad crystals of hemi-hydrate plaster of up to 90 microns in length were produced with an average length of 60 microns.

Apart from the named organic acid crystal modifiers in their free form, various derivatives thereof may be employed, such as methyl succinate and similar esters, and itaconic acid.

The large crystals produced by the methods described above are to be contrasted with those obtained by the method described in the U.S. Patent No. 2,408,218 to Haddon, which involves the use of relatively large amounts of water and crystal modifier and the violent agitation of the mix during calcination.

What is claimed is:

1. A method for the production of low consistency calcined gypsum of crystal length in the range of 100 to 500 mircons which comprises providing powdered gypsum of particle size less than 10 mesh, mixing therewith water in an amount equal to between 25% and 67% of the weight of said gypsum, said water containing a crystal habit modifier in an amount equal to between about .025% and .067% of the weight of said gypsum, said crystal habit modifier being selected from the group consisting of succinic acid, citric acid, maleic acid, malic acid, phthalic acid, and water-soluble salts thereof, maintaining the mixture under substantially quiescent conditions while heating the same at a temperature between about 120 and 170° C. under autogenous pressure for a time sufficient at the temperature to calcine the same to the hemihydrate state, whereby to disrupt said minus 10 mesh particles into crystals of calcined gypsum within the said length range.

2. A method for the production of low consistency calcined gypsum of crystal length in the range of 100 to 500 microns which comprises providing powdered gypsum, mixing therewith water in an amount equal to between 25% and 67% of the weight of said gypsum, said water containing a crystal habit modifier in an amount equal to between about 0.25% and .067% of the weight of said gypsum, said crystal habit modifier being selected from the group consisting of succinic acid, citric acid, maleic acid, malic acid, phthalic acid, and water-soluble salts thereof, maintaining the mixture under substantially quiescent conditions while heating the same at a temperature between about 120 and 170° C. under autogenous pressure for a time sufficient at the temperature to calcine the same to the hemihydrate state, whereby calcined gypsum crystals within the said length range are produced from said powdered gypsum.

3. The method of claim 2 in which calcium carbonate is added to the powdered gypsum with the crystal habit modifier, the amount of said carbonate being about .05% of the weight of the gypsum.

References Cited

UNITED STATES PATENTS

| | | | |
|---|---|---|---|
| 2,907,668 | 10/1959 | Nies et al. | 23—122 |
| 2,913,308 | 11/1959 | Dailey et al. | 23—122 |
| 3,081,152 | 3/1963 | Johnson | 23—122 |

OSCAR R. VERTIZ, *Primary Examiner.*

EARL C. THOMAS, *Assistant Examiner.*

U.S. Cl. X.R.

106—110